(12) United States Patent
Sartori

(10) Patent No.: US 9,432,442 B2
(45) Date of Patent: Aug. 30, 2016

(54) SYSTEM AND METHOD FOR A GRAPHICS TERMINAL MULTIPLIER

(75) Inventor: Gabriele Sartori, Fremont, CA (US)

(73) Assignee: nComputing Inc., Santa Clara, CA (US)

( * ) Notice: Subject to any disclaimer, the term of this patent is extended or adjusted under 35 U.S.C. 154(b) by 375 days.

(21) Appl. No.: 13/499,128

(22) PCT Filed: Oct. 1, 2010

(86) PCT No.: PCT/US2010/051215
§ 371 (c)(1),
(2), (4) Date: May 31, 2012

(87) PCT Pub. No.: WO2011/041744
PCT Pub. Date: Apr. 7, 2011

(65) Prior Publication Data
US 2012/0239740 A1    Sep. 20, 2012

Related U.S. Application Data

(60) Provisional application No. 61/248,274, filed on Oct. 2, 2009.

(51) Int. Cl.
*H04L 29/08* (2006.01)
*H04N 21/41* (2011.01)
*H04N 21/4363* (2011.01)
*H04N 21/647* (2011.01)

(52) U.S. Cl.
CPC .............. *H04L 67/08* (2013.01); *H04L 67/28* (2013.01); *H04L 67/2833* (2013.01); *H04N 21/4122* (2013.01); *H04N 21/43632* (2013.01); *H04N 21/64784* (2013.01)

(58) Field of Classification Search
CPC ............. H04N 7/163; H04N 21/4104; H04N 21/4821; H04N 21/443; H04L 67/28
USPC ............ 709/217, 203, 229, 231; 725/71, 78, 725/116
See application file for complete search history.

(56) References Cited

U.S. PATENT DOCUMENTS 6,459,427 B1 *  10/2002  Mao et al. ..................... 725/109
6,493,875 B1 *  12/2002  Eames et al. ................... 725/81

(Continued)

OTHER PUBLICATIONS

"International Application Serial No. PCT/US2010/51215, Written Opinion mailed Dec. 2, 2010", 10 pgs.

(Continued)

*Primary Examiner* — Jerry Dennison
(74) *Attorney, Agent, or Firm* — Schwegman Lundberg & Woessner, P.A.

(57) ABSTRACT

Thin-client terminal systems allow server computer systems to be shared by multiple computer users. However, thin-client terminal systems that use analog signals can only be placed a limited distance from the main server computer system. On the other hand, thin-client terminal systems that rely purely on digital signals can be expensive to produce. A thin-client multiplier that combines the two different approaches communicates digitally with main server computer system such that it can be placed any distance from the main server computer system. The thin-client multiplier also provides output information received from the server system and electrical power to analog thin-client terminal systems and receives input information from the analog thin-client terminal systems. The received input information is provided to the server system for processing.

18 Claims, 10 Drawing Sheets

(56) References Cited

U.S. PATENT DOCUMENTS

| | | | |
|---|---|---|---|
| 6,757,913 B2* | 6/2004 | Knox | 725/153 |
| 6,810,233 B2* | 10/2004 | Patsiokas | 455/3.02 |
| 7,010,263 B1* | 3/2006 | Patsiokas | 455/3.02 |
| 7,099,951 B2* | 8/2006 | Laksono | 709/231 |
| 7,200,855 B2* | 4/2007 | Laksono | 725/82 |
| 7,301,900 B1* | 11/2007 | Laksono | 370/230 |
| 7,827,581 B1* | 11/2010 | Eiger et al. | 725/81 |
| 2001/0005908 A1* | 6/2001 | Hodge et al. | 725/121 |
| 2003/0092376 A1* | 5/2003 | Syed | 455/3.06 |
| 2003/0231655 A1* | 12/2003 | Kelton et al. | 370/468 |
| 2006/0109808 A1* | 5/2006 | Ritter | 370/315 |
| 2007/0178884 A1* | 8/2007 | Donovan et al. | 455/411 |
| 2008/0010652 A1* | 1/2008 | Booth | 725/1 |
| 2008/0092171 A1* | 4/2008 | Roberts et al. | 725/46 |
| 2008/0129864 A1* | 6/2008 | Stone et al. | 348/468 |
| 2009/0031419 A1 | 1/2009 | Laksono | |

OTHER PUBLICATIONS

"International Application Serial No. PCT/US2010/51215, Search Report mailed Dec. 2, 2010", 4 pgs.

International Application Serial No. PCT/US2010/ 51215, International Preliminary Report mailed Apr. 12, 2012, 6 pgs.

* cited by examiner

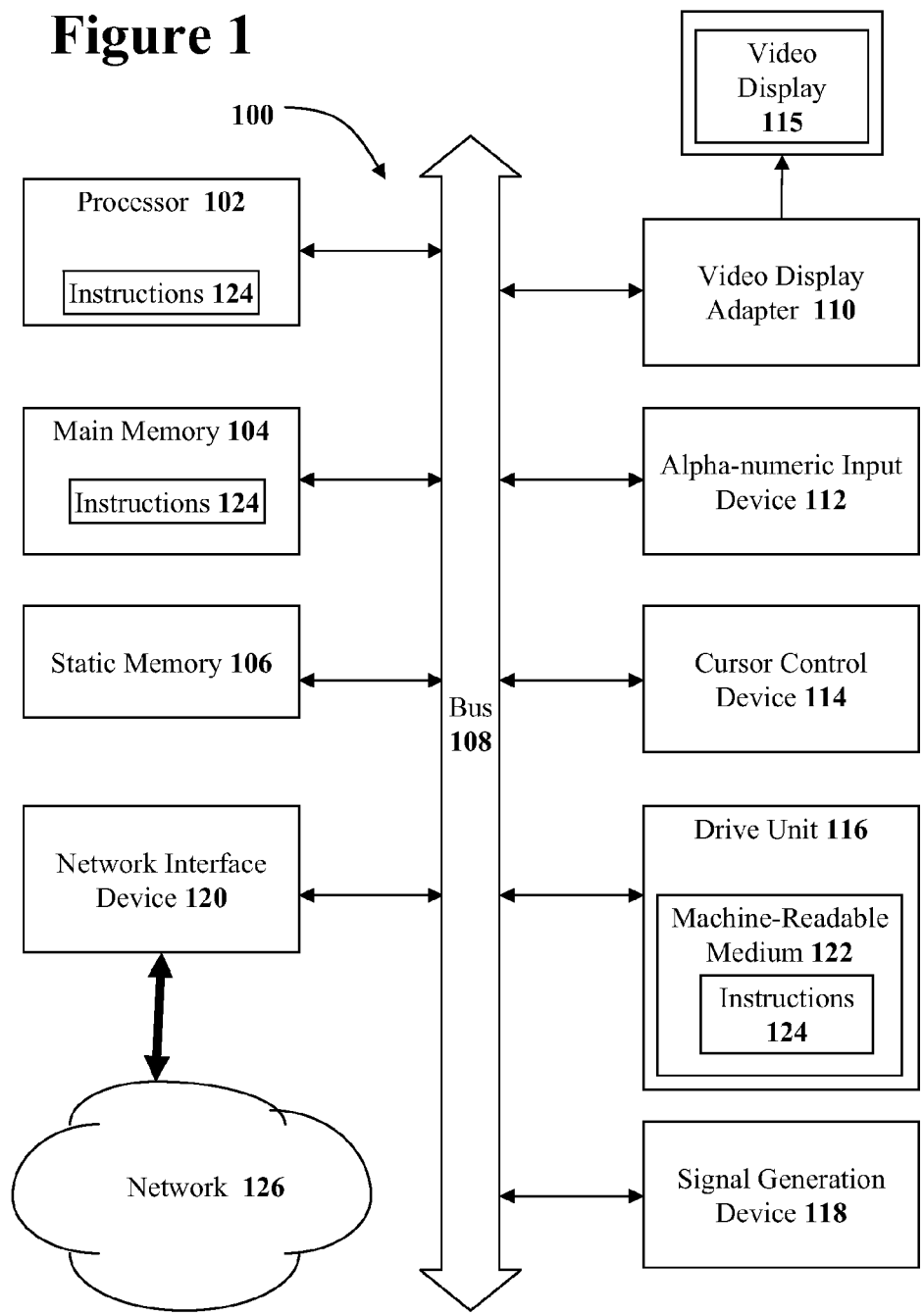

SYSTEM AND METHOD FOR A GRAPHICS TERMINAL MULTIPLIER

CROSS-REFERENCE TO RELATED APPLICATIONS

This application is a U.S. National Stage filing under 35 U.S.C. 371 from International Patent Application Ser. No. PCT/US2010/051215, filed Oct. 1, 2010, and published on Apr. 7, 2011 as WO 2011/041744A1, which claims the benefit of U.S. Provisional Patent Application Ser. No. 61/248,274 filed Oct. 2, 2009 ("SYSTEM AND METHOD FOR A GRAPHICS TERMINAL MULTIPLIER"), the contents of which are incorporated herein by reference in their entirety.

TECHNICAL FIELD

The present invention relates to the field of thin-client systems. In particular, but not by way of limitation, the present invention discloses techniques for implementing a multiplier for thin-client terminal systems.

BACKGROUND

Centralized computer systems with multiple terminal systems for accessing the centralized computer systems were once the dominant computer system architecture. These initially very expensive mainframe or mini-computer systems were shared by multiple computer users wherein each computer user had access to a terminal system coupled to the mainframe computer.

In the late 1970s and early 1980s, semiconductor microprocessors and memory devices allowed the creation of inexpensive personal computer systems. Personal computer systems revolutionized the computing industry by allowing each individual computer user to have access to their own full computer system. Each personal computer user could run their own software applications and did not need to share any of the personal computer's resources with any other computer user.

Although personal computer systems have become the dominant form of computing, there has been a resurgence of the centralized computer system model wherein multiple computer users access a server system using individual computer terminals. Computer terminal systems can have significantly reduced maintenance costs since computer terminal users cannot easily introduce computer viruses into the main computer system or load other unauthorized computer programs. Terminal based computing also allows multiple users to easily share the same set of software applications.

Modern personal computer systems have become increasingly powerful over the decades such that a modern personal computer system is more powerful than the mainframe and mini-computer systems of the 1970's. In fact, modern personal computer systems are so powerful that the vast majority of the computing resources in modern personal computer systems generally sit idle when a typical computer user uses a modern personal computer system. Thus, personal computer systems can now easily serve multiple computer users.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

FIG. 1 illustrates a diagrammatic representation of machine in the example form of a computer system within which a set of instructions, for causing the machine to perform any one or more of the methodologies discussed herein, may be executed.

DETAILED DESCRIPTION

Figure 2A:
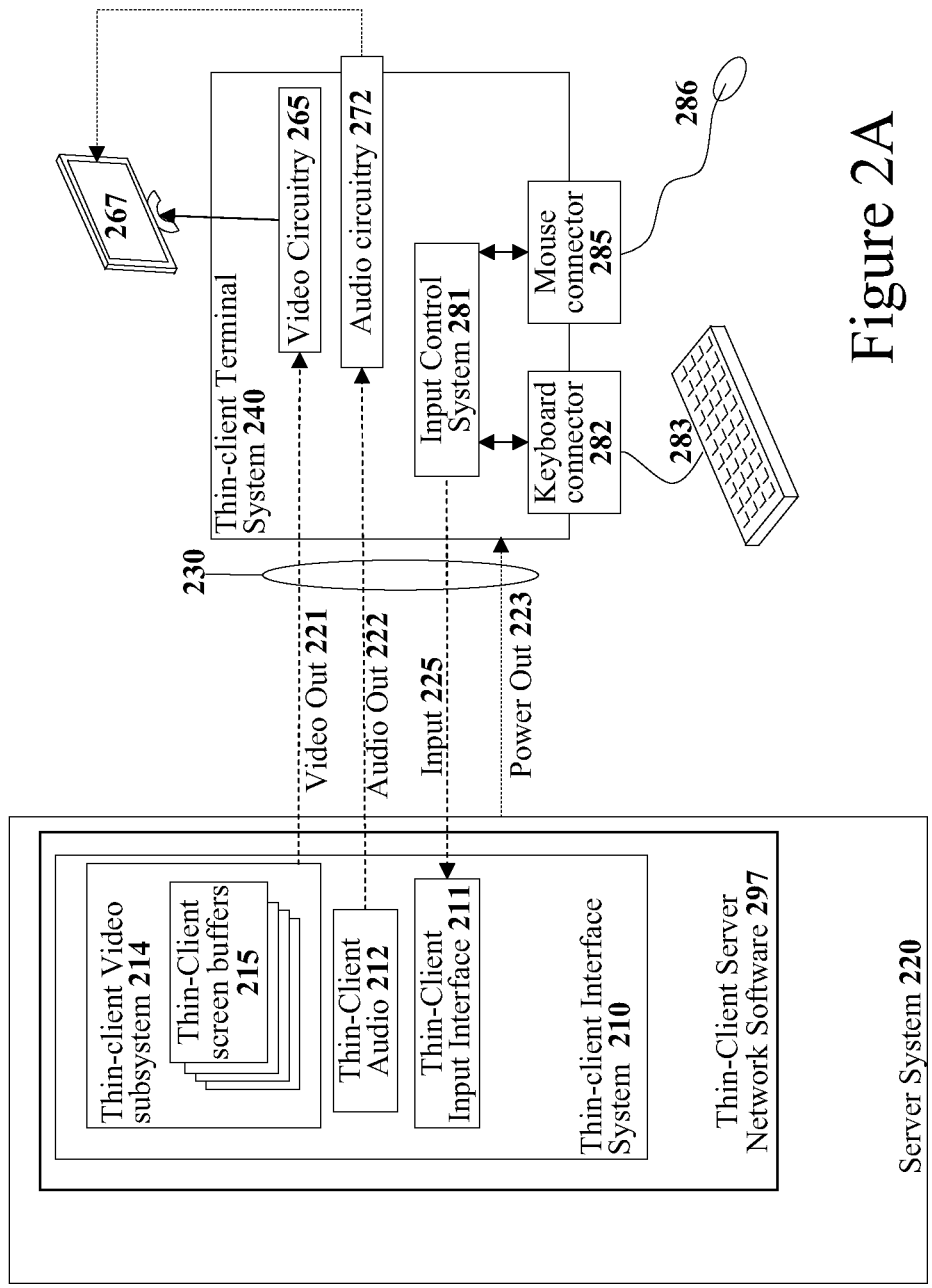
FIG. 2A illustrates a block diagram of a first example embodiment of a thin-client terminal system coupled to a thin-client server computer system.

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice the invention. It will be apparent to one skilled in the art that specific details in the example embodiments are not required in order to practice the present invention. For example, although the example embodiments are mainly disclosed with reference to a thin-client system, the teachings can be used in other environments. The example embodiments may be combined, other embodiments may be utilized, or structural, logical and electrical changes may be made without departing from the scope what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Computer Systems

The present disclosure concerns computer systems. FIG. 1 illustrates a diagrammatic representation of machine in the example form of a computer system 100 that may be used to implement portions of the present disclosure. Within computer system 100 there are a set of instructions 124 that may be executed for causing the machine to perform any one or more of the methodologies discussed herein. In a networked deployment, the machine may operate in the capacity of a server machine or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of computer instructions (sequential or otherwise) that specify actions to be taken by that machine. Furthermore, while only a single machine is illustrated, the term "machine" shall also be taken to include any collection of machines that individually or jointly execute a set (or multiple sets) of instructions to perform any one or more of the methodologies discussed herein.

The example computer system 100 includes a processor 102 (e.g., a central processing unit (CPU), a graphics processing unit (GPU) or both), a main memory 104 and a static memory 106, which communicate with each other via a bus 108. The computer system 100 may further include a video display adapter 110 that drives a video display system 115 such as a Liquid Crystal Display (LCD) or a Cathode Ray Tube (CRT). The computer system 100 also includes an alphanumeric input device 112 (e.g., a keyboard), a cursor control device 114 (e.g., a mouse or trackball), a disk drive unit 116, a signal generation device 118 (e.g., a speaker) and a network interface device 120.

The disk drive unit 116 includes a machine-readable medium 122 on which is stored one or more sets of computer instructions and data structures (e.g., instructions 124 also known as 'software') embodying or utilized by any one or more of the methodologies or functions described herein. The instructions 124 may also reside, completely or at least partially, within the main memory 104 and/or within the processor 102 during execution thereof by the computer system 100, the main memory 104 and the processor 102 also constituting machine-readable media.

The instructions 124 may further be transmitted or received over a computer network 126 via the network interface device 120. Such transmissions may occur utilizing any one of a number of well-known transfer protocols such as the well known File Transport Protocol (FTP).

While the machine-readable medium 122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies described herein, or that is capable of storing, encoding or carrying data structures utilized by or associated with such a set of instructions. The term "machine-readable medium" shall accordingly be taken to include, but not be limited to, solid-state memories, optical media, and magnetic media.

For the purposes of this specification, the term "module" includes an identifiable portion of code, computational or executable instructions, data, or computational object to achieve a particular function, operation, processing, or procedure. A module need not be implemented in software; a module may be implemented in software, hardware/circuitry, or a combination of software and hardware.

The Resurgence of Terminal Systems

Before the advent of the inexpensive personal computer, the computing industry largely used mainframe or mini-computers that were coupled to a plurality of "dumb" terminal systems. Such terminal devices are referred to as "dumb" terminals since the computing ability resided within the mainframe or mini-computer, and the terminal device merely displayed an output screen and accepted alpha-numeric input. No user applications executed locally on the terminal system. Computer operators shared the mainframe computer among multiple individual computer users that each used individual terminals coupled to the mainframe computer. These terminal systems generally had very limited graphics capabilities and were generally capable of visualizing only alpha-numeric characters on the display screen of the terminal system.

With the introduction of the modern personal computer system, the use of dumb terminals largely disappeared since personal computer systems were much more cost effective. When the services of a dumb terminal were required to interface with a legacy terminal-based computer system, a personal computer system could easily execute a terminal emulation program that would emulate the operations of a dumb terminal at a cost very similar to the cost of a dedicated dumb terminal. Thus, a single system could operate as both a personal computer system and a terminal to a larger terminal-based computer system.

During the personal computer revolution, personal computers introduced high resolution graphics and cursor control devices (such as the computer mouse) to personal computer users. The combination of high-resolution graphics displays and cursor control devices allowed for much more intuitive computer user interfaces than a primitive text-only display screen. For example, virtually all current personal user interface systems now use multiple windows, icons, and pull-down menus that are implemented with high resolution graphics and navigated with a cursor control device. Furthermore, high-resolution graphics allowed for applications that used photos, videos, and graphical images.

In recent years, a new generation of high-resolution graphics terminal systems have been introduced into the computer market as people have rediscovered some of the advantages of terminal-based computing systems. For example, computer terminals allow for greater security and reduced maintenance costs since users of computer terminal systems cannot easily introduce computer viruses by downloading or installing new software into the computer system. Thus, with a centralized computer system having multiple terminals, only the main centralized computer server system needs to be closely monitored and maintained. The stateless terminal systems require almost no maintenance at all. The new generation of computer terminal systems includes high-resolution graphics capabilities, audio output, and cursor control system input (e.g., mouse, trackpad, trackball) that all personal computer users have become accustomed to using.

Modern terminal-based systems allow multiple users at individual high-resolution terminal systems to share a single personal computer system and all of the application software installed on that personal computer system. In this manner, a modern high-resolution terminal system is capable of delivering nearly the full functionality of a personal computer system to multiple users without the cost, power, and the maintenance requirements of an individual personal computer system for each user. One category of these modern terminal systems is called "thin-client" systems since the terminal systems are a "client" to main server system and the terminal systems designed to be very simple and limited (thus "thin") and thus primarily depend on a thin-client server system for application processing activities. A thin-client terminal system thus mainly focuses only on conveying input and output between the user and the centralized server system.

A First Thin-Client System Example Embodiment

FIG. 2A illustrates a block diagram of a first embodiment of a thin-client environment. In the thin-client environment of FIG. 2A, a server computer system 220 is illustrated as being coupled to one (of possibly many) thin-client terminal system 240. The thin-client server computer system 220 and thin-client terminal system 240 are coupled with a multi-conductor wire 230 that carries input from a user of the thin-client terminal system 240 to the server computer system 220 and output from the server computer system 220 to the thin-client terminal system 240.

Figure 2B:
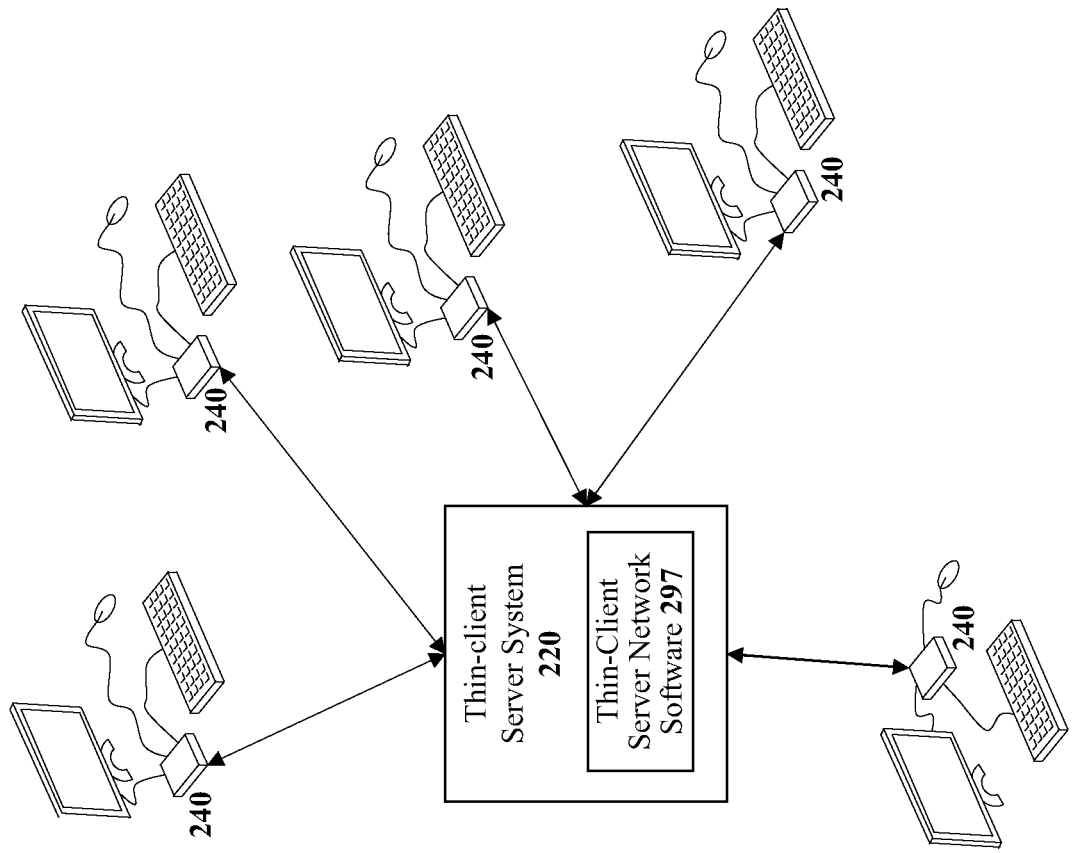
FIG. 2B illustrates a high-level block diagram of the example embodiment of the single thin-client server computer system of FIG. 2A supporting multiple individual thin-client terminal systems using multi-conductor wire that includes analog signals and electrical power, in accordance with an example embodiment.

FIG. 2B illustrates a conceptual diagram of the server computer system 220 from FIG. 2A providing computer processing resources to a plurality of individual thin-client terminal systems 240. A single thin-client server computer system 220 is coupled to several individual thin-client terminal systems 240 in a hub & spoke arrangement since the example embodiment of FIG. 2A is illustrated as a direct connection between the thin-client server computer system 220 and each of the thin-client terminal systems 240. The individual thin-client terminal systems 240 are served using thin-client server network software 297 running on thin-client server computer system 220.

Referring back to FIG. 2A, the goal of thin-client terminal system 240 is to provide most or all of the standard input and output features of a personal computer system to the user of the thin-client terminal system 240. However, this goal is to be achieved with as low of a cost as possible. To reduce costs, the thin-client terminal system 240 will not provide application software or the full computing resources of a personal computer system within thin-client terminal system 240. Instead, those features will be provided by the thin-client server system 220 that will interact with the thin-client terminal system 240. Thus, the thin-client terminal system 240 merely acts as an input and output device for the thin-client server computer system 220

In the thin-client embodiment of FIG. 2A, the thin-client terminal system 240 acts largely as a simple pass through system such that most of the hardware for driving the thin-client terminal system 240 actually resides within the server computer system 220. This type of thin-client architecture allows the actual thin-client terminal devices 240 in the implementation of FIG. 2A to be a very inexpensive.

In the embodiment of FIG. 2A, a thin-client interface system 210 is responsible for interacting with all of the attached thin-client terminal systems 240. To generate video output for each thin-client terminal system 240, a thin-client video subsystem 214 in the server system 220 maintains a screen buffer 215 for each of the thin-client terminal systems 240. Video display circuitry within the server system 220 reads the screen buffer 215 contents and drives an analog video output 221 for each thin-client terminal system 240. Relatively simple video circuitry 265 in the thin-client terminal system 240 passes the analog video output signal to a video display monitor 267. Audio may be handled in a similar manner wherein a thin-client audio system 212 generates analog audio output 222 for each of the thin-client terminal systems 240. In the embodiment of FIG. 2A, the analog audio information is also passed from audio circuitry 272 to the video display monitor 267. In an alternate embodiment, the thin-client audio system 212 may pass a digital auto signal to the thin-client terminal system 240 which is then decoded and demodulated by the audio circuitry 272 into an analog audio signal at the thin-client terminal system 240.

Input from the thin-client terminal systems 240 is handled using an input control system 281 that receives input information from a keyboard 283 (coupled to a keyboard connector 282) and a mouse 286 (coupled to a mouse connector 285). The input control system 281 encodes the user input information (e.g., keystrokes and mouse movements) and passes that user input information to a thin-client input interface system 211 in the server system 220. In one particular embodiment, the design of the thin-client terminal systems 240 is so efficient that each thin-client terminal system 240 receives all of its needed electrical power from a power out conductor 223 in the multi-conductor wire 230.

On the server side, the thin-client server computer system 220 is equipped with multi-user software for interacting with multiple thin-client terminal systems. As illustrated in FIG. 2A, a thin-client interface system 210 within thin-client server system 220 supports the thin-client terminal system 240 as well as any other thin-client terminal systems (not shown) coupled to thin-client server system 220. Each thin-client terminal system 240 may have its own dedicated screen buffer 215 within the thin-client video subsystem 214 in the thin-client server system 220.

The thin-client terminal system 240 embodiment of FIG. 2A is a very efficient embodiment that requires a very minimal amount of hardware within the actual thin-client terminal system 240 located at the user location. Most of the difficult aspects of providing terminal service, such as the generation of a video signal to drive video display system 267, are performed within the server system 220 wherein the power supply systems, bus infrastructure, and operating system support of the server system 220 can be used to help perform these tasks associated with providing terminal service. In this manner, the thin-client terminal system 240 is relatively simple and thus very inexpensive to produce. However, the particular thin-client embodiment of FIG. 2A does have some drawbacks. One drawback is that since the embodiment of FIG. 2A uses an analog video signal to transmit video information from the server system 220 to the individual thin-client terminal systems 240, the length of the multi-conductor wire 230 must be kept relatively short. If too long of a multi-conductor wire 230 is used, the analog signal may not be sufficiently strong to generate high quality video at the thin-client terminal system 240.

A Second Thin-Client System Example Embodiment

Figure 3A:
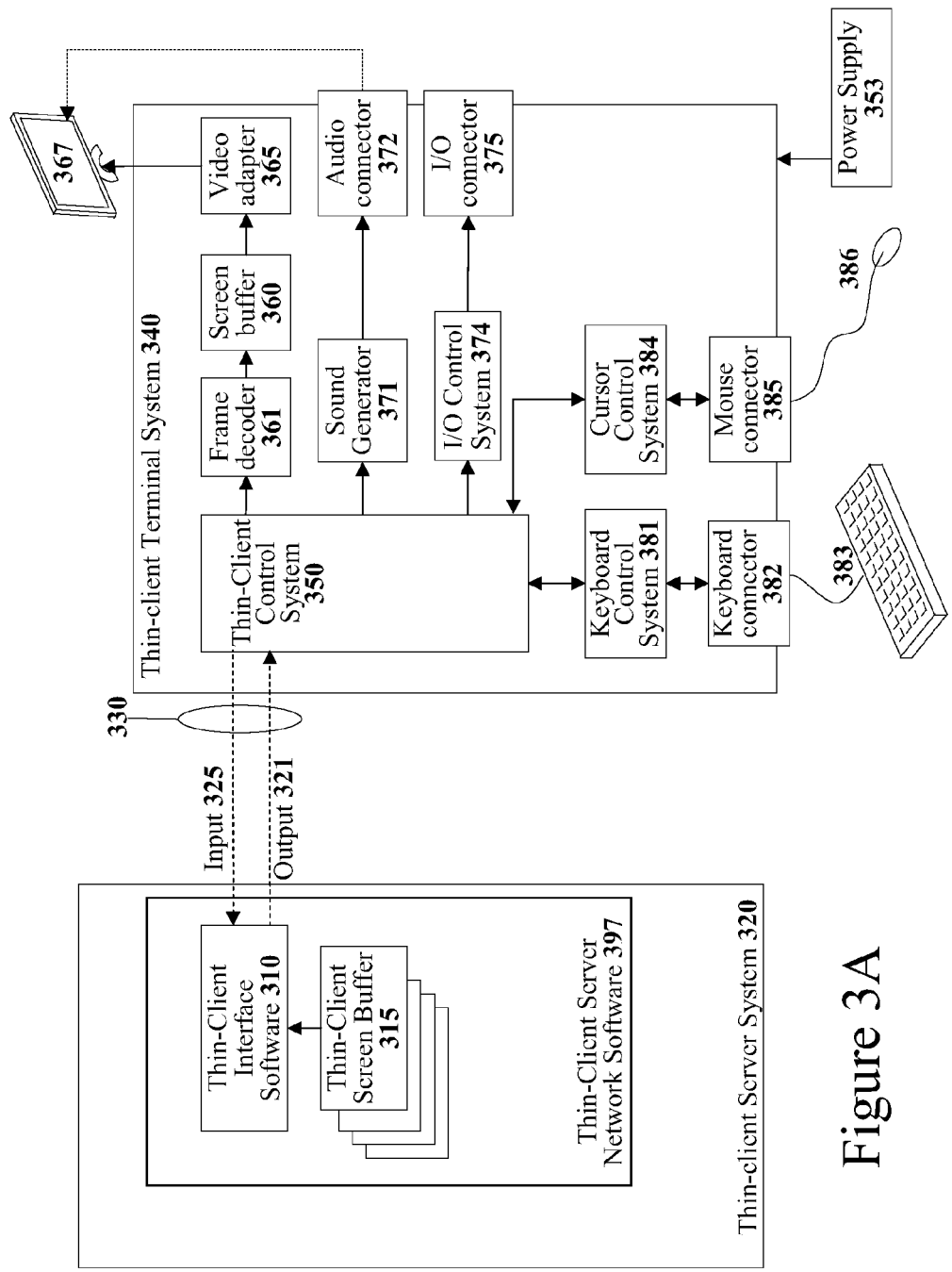
FIG. 3A illustrates a block diagram of a second example embodiment of a thin-client terminal system coupled to a thin-client server computer system using a purely digital communication line.

FIG. 3A illustrates a high-level block diagram of a second example embodiment of a thin-client server computer system 320 coupled to one (of possibly many) thin-client terminal system 340. The thin-client server computer system 320 and thin-client terminal system 340 are coupled via a bi-directional digital communications channel 330 that may be a serial data connection, an Ethernet connection, a wireless connection based on a wireless communication standard, such as the IEEE 802.11 standard, or any other suitable bi-directional digital communication means.

Figure 3B:
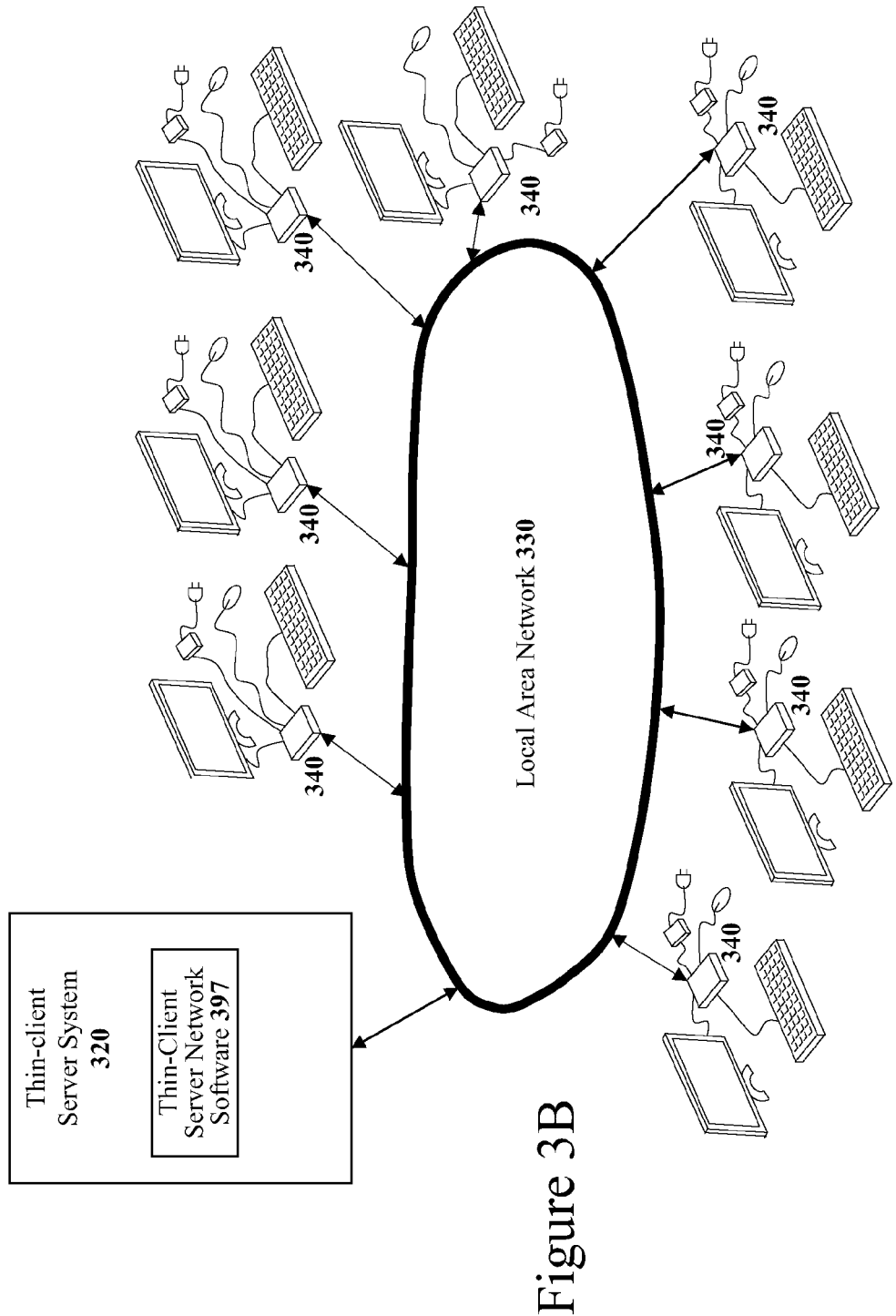
FIG. 3B illustrates a high-level block diagram of the example embodiment of the single thin-client server computer system of FIG. 3A supporting multiple individual thin-client terminal systems using a local area network, in accordance with an example embodiment.

FIG. 3B illustrates a conceptual diagram of a thin-client environment using the system of FIG. 3A. Referring to FIG. 3B, a single thin-client server computer system 320 provides computer services using thin-client server network software 397 to many different thin-client terminal systems 340. In the example embodiment disclosed in FIG. 3B, each of the individual thin-client terminal systems 340 is coupled to the thin-client server computer system 320 using local area network 330 such as Ethernet as a bi-directional communication channel. In such an embodiment, each of the individual thin-client terminal systems 340 will generally require its own individual power supply that is coupled to a power source such as an AC line current.

Figure 3C:
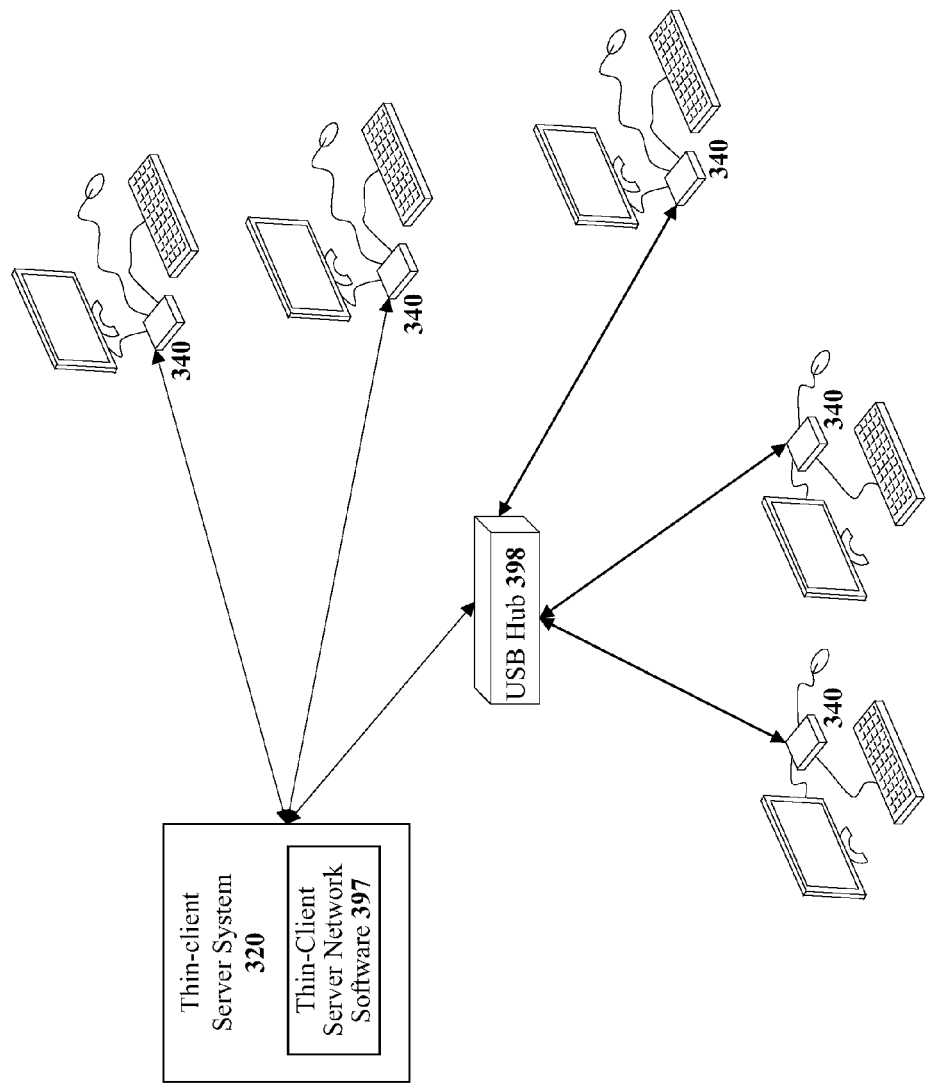
FIG. 3C illustrates a high-level block diagram of the example embodiment of the single thin-client server computer system of FIG. 3A supporting multiple individual thin-client terminal systems using a universal serial bus connection.

FIG. 3C illustrates an alternate conceptual diagram of a thin-client environment using the thin-client architecture of FIG. 3A. In FIG. 3C, a single thin-client server computer system 320 provides computer services to many different thin-client terminal systems 340 using a serial bus system, such as the Universal Serial Bus (USB), as a bi-directional communication channel. In such an embodiment, a Universal Serial Bus hub 398 may be used to help couple more thin-client terminal systems 340 and extend the physical distance from the thin-client server computer system 320 where thin-client terminal systems 340 can be located. Additionally, in the event that a local area network is not available or feasible, the serial bus system used to connect the thin-client server computer system 320 to thin-client terminal systems 340 may emulate or provide an alternate option to the local area network for connecting the thin-client server computer system to the thin-client terminal systems.

As set forth in the previous section, the goal of any thin-client terminal system (such as thin-client terminal system 340) is to provide most or all of the standard input and output features of a personal computer system to the user of the thin-client terminal system 340. However, this goal is to be achieved without providing the full computing resources or software of a personal computer system within thin-client terminal system 340 since those features will be provided by the thin-client server system 320 that will interact with the thin-client terminal system 340. In the embodiment of FIG. 3A, the thin-client terminal system 340 is more sophisticated and thus more costly than the thin-client terminal system 240 of FIG. 2A. For example, the thin-client terminal system 340 is tasked with generating a video signal locally, and the thin-client terminal system 340 is responsible for providing its own operating power. Despite including these features, each thin-client terminal system 340 is still far more primitive than a full personal computer system and thus much less expensive than a personal computer system.

Referring to the block diagram of FIG. 3A, the thin-client terminal system 340 provides both visual and auditory output using a high-resolution video display system to drive display system 367 and an audio output system to drive an audio output signal, respectively. In general, the thin-client terminal system 340 may have its own power supply 353 since most digital communication lines 330 do not provide power.

The high-resolution video generation system of thin-client terminal system 340 consists of thin-client control system 350, a frame decoder 361, a screen buffer 360, and a video adapter 365. The thin-client control system 350 identifies packets with video information and directs that video information to frame decoder 361. The frame decoder 361 decodes digital video information from the associated thin-client screen buffer 315 in the server and places that digital video information into screen buffer 360 thus making screen buffer 360. Screen buffer 360 contains a copy of the bit-mapped display in thin-client screen buffer 315. Video adapter 365 reads the video display information out of screen buffer 360 and generates a video display signal to drive display system 367. The screen buffer 360 is filled with video display information provided by thin-client control system 350 using video information sent as output 321 by the thin-client server system 320 across bi-directional digital communications channel 330. Specifically, the video frame encoder 317 in the thin-client server system 320 sends information from a thin-client screen buffer 315 to the thin-client terminal system 340 so that the thin-client terminal system 340 can create a copy in its screen buffer 360.

The audio system within thin-client terminal system 340 operates in a similar manner to the video system. The audio system consists of a sound generator 371 coupled to an audio connector 372 for creating an audio signal for an output device such as monitor 367. The sound generator 371 is supplied with audio information thin-client control system 350 using audio information sent as output 321 by the thin-client server system 320 across bi-directional communications channel 330.

From an input perspective, thin-client terminal system 340 allows for both alpha-numeric input and cursor control input from a terminal system user to be supplied to the thin-client computer system 320. The alpha-numeric input is provided by a keyboard 383 coupled to a keyboard connector 382 that supplies signals to a keyboard control system 381. Thin-client control system 350 encodes keyboard input from keyboard control system 381 and sends that keyboard input as input 325 to the thin-client server system 330. Similarly, the thin-client control system 350 encodes cursor control input from cursor control system 384 and sends that cursor control input as input 325 to the thin-client server system 320. The cursor control input is received through a mouse connector 385 from a computer mouse 385 or any other suitable cursor control device such as a trackball, trackpad, etc.

The thin-client terminal system 340 may include other input, output, or combined input/output systems in order to provide additional functionality to the user of the thin-client terminal system 340. For example, the thin-client terminal system 340 illustrated in FIG. 3A includes input/output control system 374 coupled to input/output connector 375. Input/output control system 374 may be a Universal Serial Bus (USB) controller and input/output connector 375 may be a USB connector in order to provide Universal Serial Bus (USB) capabilities to the user of thin-client terminal system 340.

Thin-client server computer system 320 is equipped with thin-client server network software 397 for interacting with multiple thin-client systems. As illustrated in FIG. 3A, the thin-client server network software 397 in thin-client server system 320 supports the thin-client terminal system 340 as well as any other thin-client terminal systems coupled to the same thin-client server system 320. Each thin-client terminal system 340 will have its own associated screen buffer in the thin-client server system 320 such as thin-client terminal screen buffer 315.

Unlike the thin-client terminal system 240 of FIG. 2A, the thin-client terminal system 340 may communicate using digital information across bi-directional communications channel 330, thereby allowing thin-client terminal system 340 to be placed any distance from thin-client server computer system 320. In fact, as long as there is an appropriate digital communication channel 330, a thin-client terminal system 340 could be used to interact with a server system 320 on the other side of the planet. Furthermore, standard network systems such as Ethernet may be used to implement the digital communication channel 330. However, the sophistication of the electronic circuitry within thin-client terminal system 340 may render that system more expensive than thin-client terminal system 240. Furthermore, thin-client terminal system 340 does not receive its operating power through the communication line such that each individual thin-client terminal system 340 requires its own power supply 453 which further increases the cost of thin-client terminal system 340.

An Example Thin-Client Multiplier Device

To combine the features of the thin-client terminal system 340 along with the reduced cost of thin-client terminal system 240, a thin-client multiplier device has been developed. The thin-client multiplier device allows a group of very inexpensive thin-client terminal systems to be located any distance from the server. The cost of such a system is much less than providing individual full thin-client terminal system 340 as illustrated in FIGS. 3A and 3B to each user.

Figure 4A:
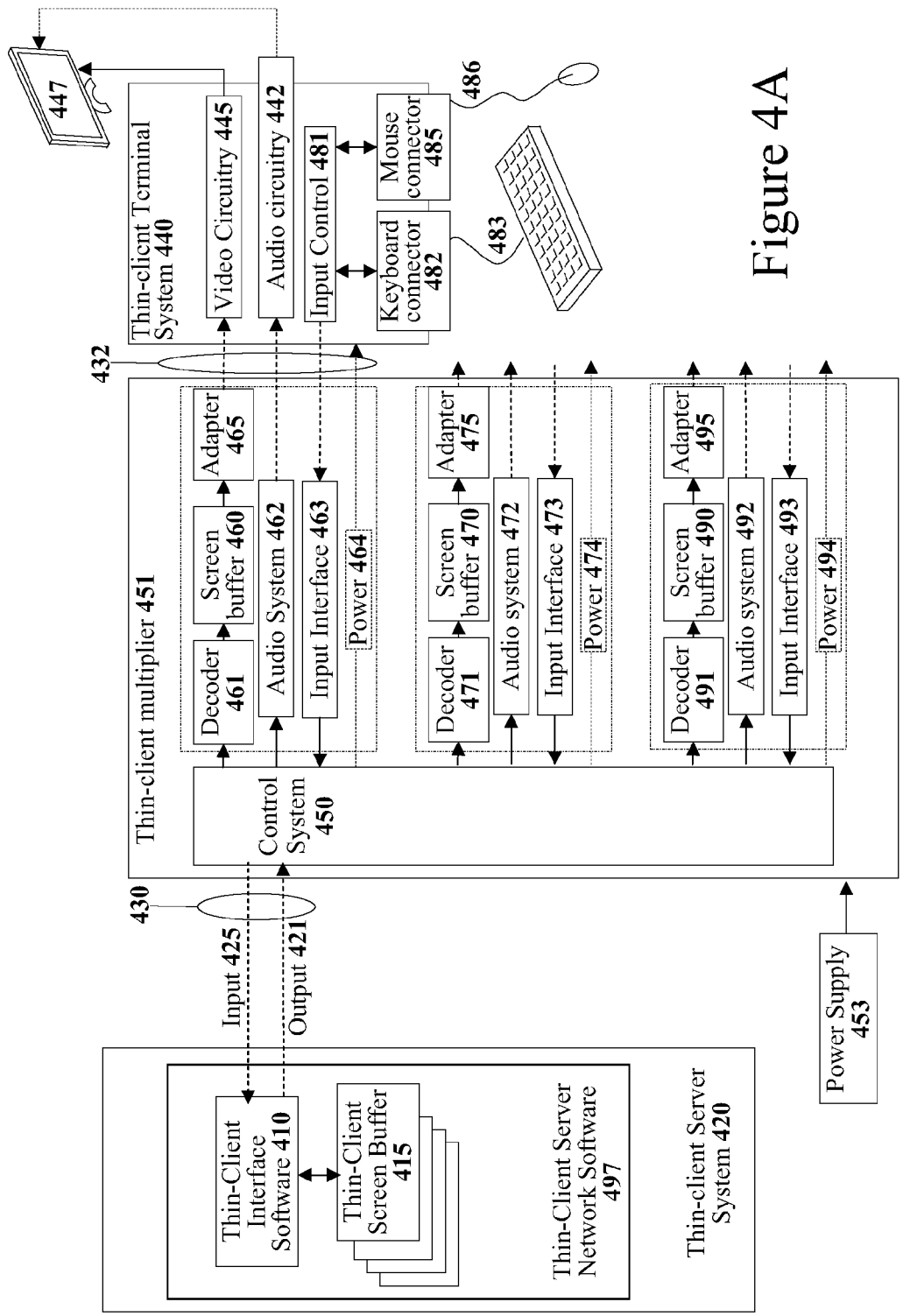
FIG. 4A illustrates a block diagram of an example embodiment of a thin-client multiplier that couples the thin-client server computer system of FIG. 3A to more than one thin-client terminal systems of the example embodiment of FIG. 2A.

FIG. 4A illustrates a block diagram of an embodiment of a thin-client multiplier device 451 within a thin-client environment. The thin-client multiplier device 451 is coupled to thin-client server computer system 420 using a bi-directional digital communications channel 430 that may be a serial data connection (such as USB), a digital network connection (such as Ethernet), a wireless connection (such as 802.11), or any other suitable bi-directional digital communication means. The thin-client multiplier 451 may also be coupled to multiple thin-client terminal systems 440 (only one is shown) with a multi-conductor wire 432. Multi-conductor wire 432 may be a Category 5 or Category 6 cable. In an example embodiment, input/output devices, such as a display device and one or more cursor control devices (e.g., keyboard, mouse) may directly connect to input/output ports in the thin-client multiplier device 451 as opposed to connecting to ports and connectors in the thin-client terminal system 440. Direct connection of input/output devices to the thin-client multiplier device 451 may be desirable in cases where thin-client terminal devices are clustered or in close proximity.

Figure 4B:
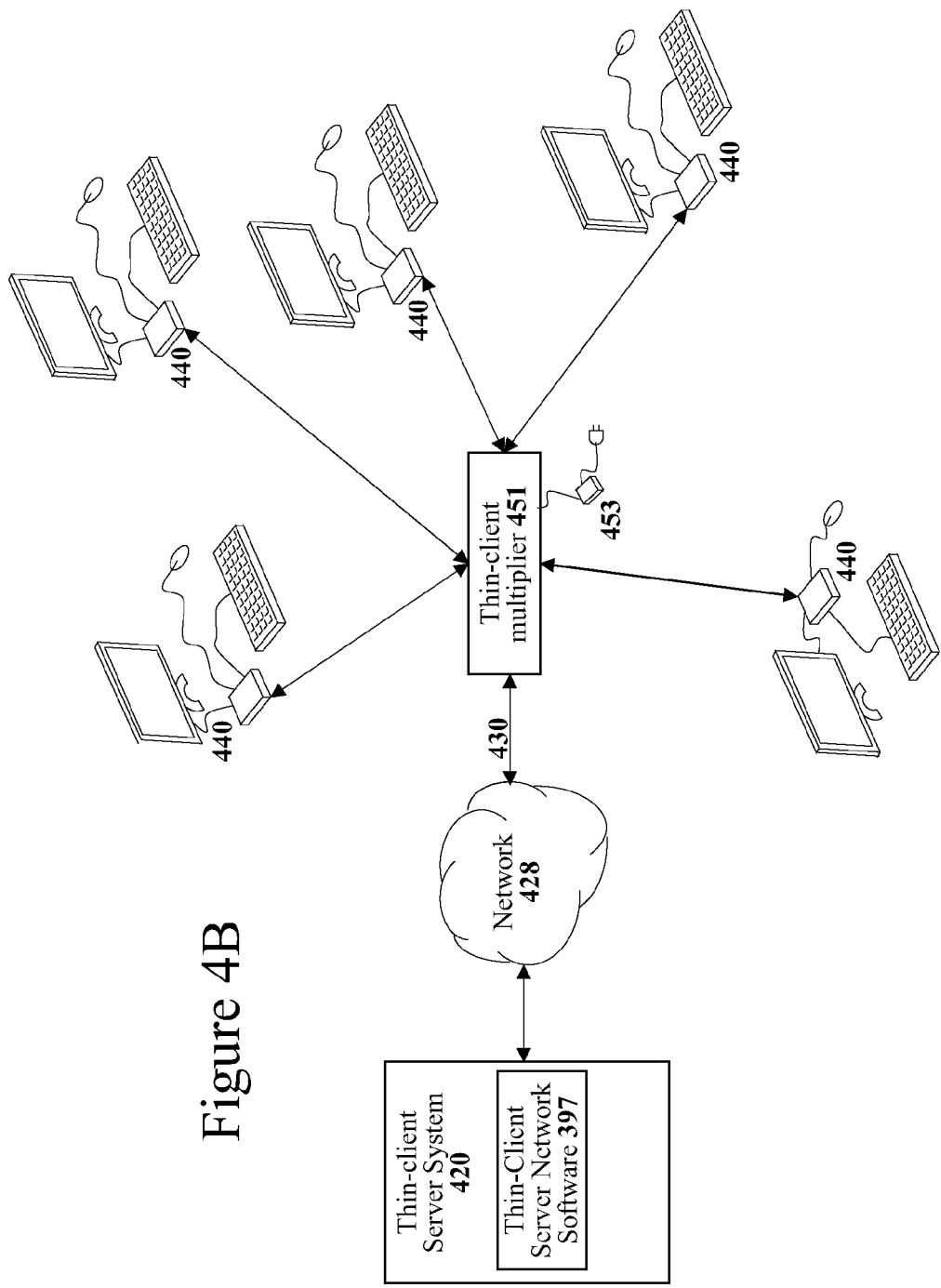
FIG. 4B illustrates a high-level block diagram of the example embodiment of the thin-client server computer system of FIG. 3A coupled by a computer network connection to the example embodiment of the thin-client multiplier of FIG. 4A for supporting multiple individual thin-client terminal systems from the embodiment of FIG. 2A.

FIG. 4B illustrates a first conceptual diagram of a thin-client environment using the thin-client multiplier device 451 of FIG. 4A. In the embodiment of FIG. 4B, a thin-client server computer system 420 is coupled to a thin-client multiplier device 451 through digital network link 430. Digital network link 430 may be a wired (e.g., Ethernet, USB) or wireless communication channel. The signal on the digital network link 430 may be carried on a digital computer network 428 (e.g., local area network, wide area network) to thin-client system 420 located remote from the thin-client multiplier device 451.

Figure 4C:
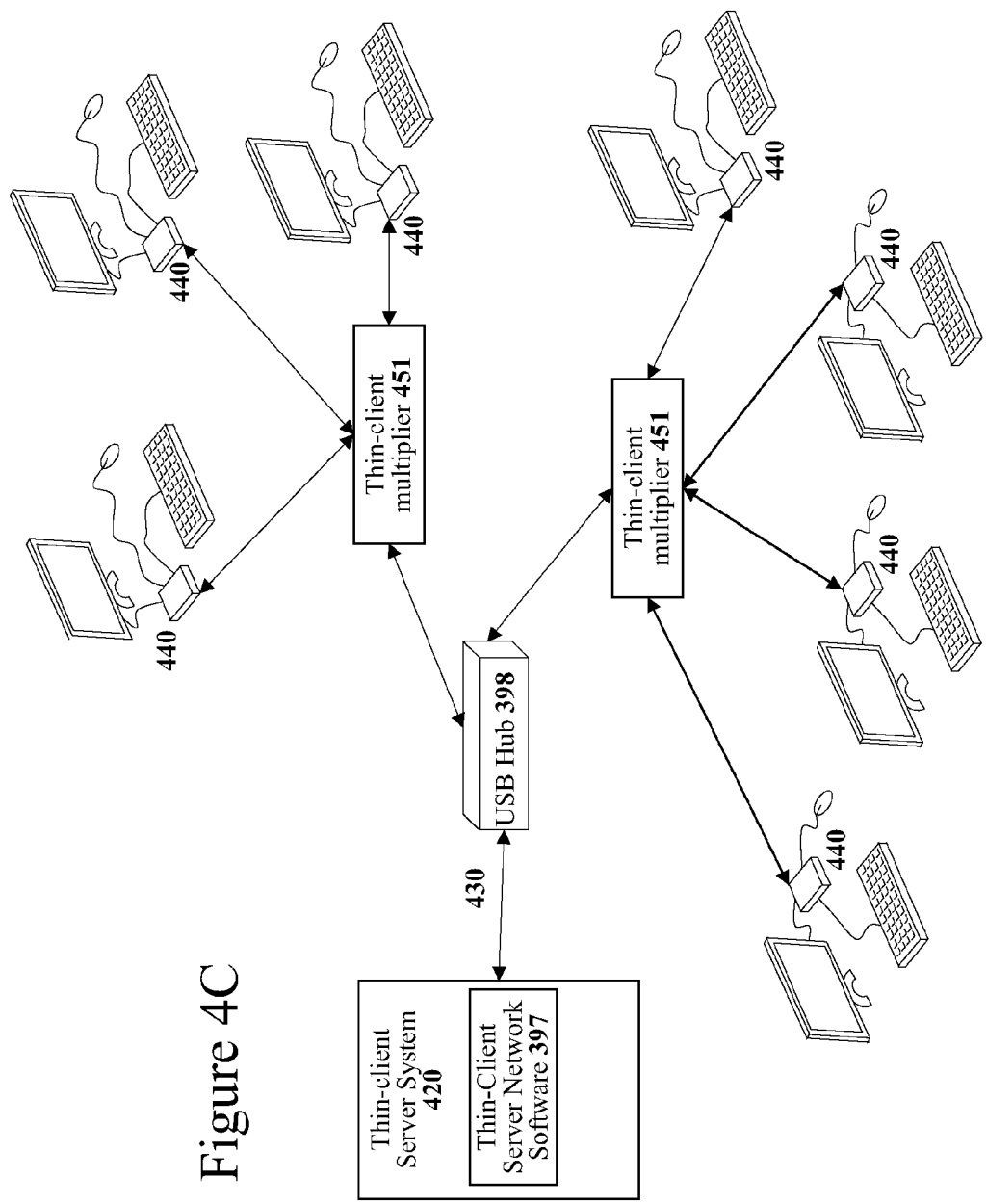
FIG. 4C illustrates a high-level block diagram of the example embodiment of the thin-client server computer system of FIG. 3A coupled via a universal serial bus connection to the example embodiment of the thin-client multiplier of FIG. 4A for supporting multiple individual thin-client terminal systems from the embodiment of FIG. 2A.

FIG. 4C illustrates a second conceptual diagram of a thin-client environment using the thin-client multiplier device 451 of FIG. 4A. In the embodiment of FIG. 4C, a thin-client server computer system 420 is coupled to two thin-client multiplier devices 451 through a USB line 430 and a USB hub 398. Additional USB hubs 398 and thin-client multiplier devices 451 may be coupled to the USB line 430 as necessary to provide additional thin-client terminal systems 440 as needed until the data traffic on the USB line 430 becomes too heavy. The USB line 430 and the USB hub 398 may emulate a local area network or otherwise replace or substitute for a local area network.

The thin-client multiplier device 451 in FIGS. 4B and 4C is coupled to several local thin-client terminal systems 440. Each of the individual thin-client terminal systems 440 is coupled to the thin-client multiplier device 451 using multi-conductor wire that may carry both information signals and electrical power such that thin-client terminal systems 440 do not need an external power supply. Specifically, all of the attached thin-client terminal systems may be powered from the power generated by the power supply 453 associated with the thin-client multiplier device 451.

Referring back to FIG. 4A, the thin-client multiplier device 451 receives all of the output information across digital bi-directional digital communications channel 430 for all the thin-client terminal systems coupled to that thin-client multiplier device 451. Similarly, the thin-client multiplier device 451 transmits all user input received from the thin-client terminal systems 440 across the digital communications channel 430 to thin-client server computer system 420.

Since the thin-client multiplier device 451 handles multiple thin-client terminal systems 440, an addressing system is needed to identify which particular thin-client terminal system a particular unit of input or output information is associated with. In one embodiment, the thin-client multiplier device 451 obtains (or is assigned) a unique network address, such as an Internet Protocol (IP) address, for each individual thin-client terminal system 440 that the thin-client multiplier device 451 supports. In such an embodiment, the thin-client multiplier device 451 would appear to the thin-client server computer system 420 similar to several individual thin-client terminal systems 340 from the embodiment illustrated in FIG. 3A. In this manner, the thin-client multiplier device 451 could be made backwards-compatible with the same thin-client server software used in the thin-client server system 320 illustrated in FIG. 3A. Such a system would reduce product line complexity and simplify deployment. In an alternate embodiments, the thin-client multiplier device 451 may use a single IP address but different TCP/UDP port numbers or an proprietary addressing system to identify each of the individual thin-client terminal system 440 served by the thin-client multiplier device 451.

Within the thin-client multiplier device 451, a control system 450 receives all output from the thin-client server computer system 420 destined to any of the thin-client terminal systems coupled to thin-client multiplier 451. Using one of the addressing systems mentioned above, the control system 450 determines which thin-client terminal system 440 output data is destined for and delivers the output data to output circuitry assigned with the addressed thin-client terminal system 440. For example, if the thin-client server computer system 420 were to send audio data destined for thin-client terminal system 440 in FIG. 4A, the control system 450 would pass that audio data to audio system 462 in a section of circuitry (460 to 465) dedicated to thin-client terminal system 440. Audio system 462 then transmits an appropriate audio signal out to that thin-client terminal system 440. The audio signal may be analog or digital depending on the specific implementation.

In the embodiment of FIG. 4A, there are sections of circuitry for three different thin-client terminal systems: a first section of circuitry (460 to 465) for thin-client terminal system 440 and two additional sections of circuitry (470 to 475 and 490 to 495) for two additional thin-client terminal systems (not shown). Each of these sections of circuitry may be referred to as a terminal interface circuit. Each terminal interface circuit for a thin-client terminal system includes subsections for video output, audio output, keyboard & mouse input, and power output. For illustration purposes only, three terminal interface circuits have been included in the thin-client multiplier 451 of the example embodiment of FIG. 4A. However, it is contemplated that any number of terminal interface circuits may be included within the thin-client multiplier 451.

Referring to the first terminal interface circuit (460 to 465) for thin-client terminal system 440, the high-resolution video section consists of a frame decoder 461, a video screen buffer 460, and a video adapter 465. The frame decoder 461 decodes digital video information received from the associated thin-client screen buffer 415 in the server 420 and places that digital video information into screen buffer 460 thus creating a representation of a video screen. Specifically, screen buffer 460 contains a copy of the bit-mapped display in thin-client screen buffer 415. Video adapter 465 then reads the video display information out of screen buffer 460 and generates an analog video display signal to drive display system 447. As set forth above, the audio system operates in a similar manner. Specifically, the audio system 462 is supplied with digital audio information from control system 450 and transmits an appropriate audio output signal to the associated thin-client terminal system 440. The audio system 462 may decode and demodulated the audio data into an analog audio signal provided to the thin-client system. Alternatively, the audio system 462 may simply pass digital audio data to the associated thin-client terminal system 440 for decoding and demodulating by the audio circuitry 442 within the thin-client terminal system 440.

From a user input perspective, an input interface 463 with each terminal interface circuit in thin-client multiplier device 451 receives both alpha-numeric input and cursor control device input from the associated thin-client terminal system 440. The thin-client multiplier device 451 may support both Personal System/2-compatible devices (PS/2) as well as USB-compatible devices. The input interface 463 also may receive input from various slave devices, such as USB flash drives, portable hard drives, and music devices, that are connected to connectors or ports (not shown) in the associated thin-client terminal system 440. In an example embodiment, the terminal interface circuit itself may include connectors or ports (not shown) by which slave devices may be connected. The input interface 463 passes this input data to control system 450 that encodes the input data with an address specifying that the input data is from the specific thin-client terminal system 440. The encoded input data is then transmitted to the thin-client server system 420 across the bi-directional communication channel 430. For example, the user input information received from a particular thin-client terminal system 440 may be sent from thin-client multiplier device 451 to the thin-client server system 420 using an IP address specifically associated with that thin-client terminal system 440.

Finally, the subsection of circuitry within thin-client multiplier 451 associated with thin-client terminal system 440 may also include a power system that delivers power 464 across multi-conductor wire 432, such as a Category 6 cable, to thin-client terminal system 440. In this manner, the individual thin-client terminal systems 440 coupled to the thin-client multiplier device 451 do not need their own power supplies. This reduces the price of each thin-client terminal system 440. The operating power for the thin-client multiplier device 451 and all thin-client terminal systems 440 coupled to that thin-client multiplier device 451 may be supplied by single power supply unit 453.

Thus, the first terminal interface circuit (460 to 465) in thin-client multiplier 451 generates all the needed output signals for thin-client terminal system 440. However, it is particularly noteworthy that the terminal interface circuit (460 to 465) in thin-client multiplier device 451 may generate the exact same signals on multi-conductor wire 432 that the server system 220 in the thin-client embodiment of FIG. 2A places on multi-conductor wire 230. In this manner, the same thin-client terminal systems 240 from FIG. 2A can be used with the thin-client multiplier device 451 of FIG. 4A. This can be verified by noting that the thin-client terminal system 240 of FIG. 2A includes the exact same internal components as the thin-client terminal system 440 of FIG. 4A.

Due to this compatibility, the thin-client multiplier device 451 can be used as a backwards-compatible drop-in expansion device that allows a thin-client server system 320 from the thin-client embodiment of FIG. 3A to be expanded with multiple inexpensive thin-client terminal systems 240 from the embodiment of FIG. 2A. The thin-client multiplier 451 may cost a little more than the single thin-client terminal system 340 since it contains multiple individual screen buffers (460, 470, and 490), however much of the circuitry can be shared by the terminal interface circuits. For example, the same power supply circuitry can be used to generate all of the power output signals. 464, 474, and 494. Furthermore, a single fast processor can serve as the control system 450 and as all of the frame decoders (461, 471, and 491). Thus, the thin-client multiplier device 451 should only cost marginally more than the cost of a single thin-client terminal system 340 from the embodiment of FIG. 3A. And since the cost of the simple thin-client terminal system 240 of FIG. 2A is much lower than the cost of the thin-client terminal system 340 of FIG. 3A, the usage of a thin-client multiplier device 451 and a set of thin-client terminal systems from FIG. 2A may be significantly less than the same number of thin-client terminal systems from FIG. 3A.

Figure 4D:
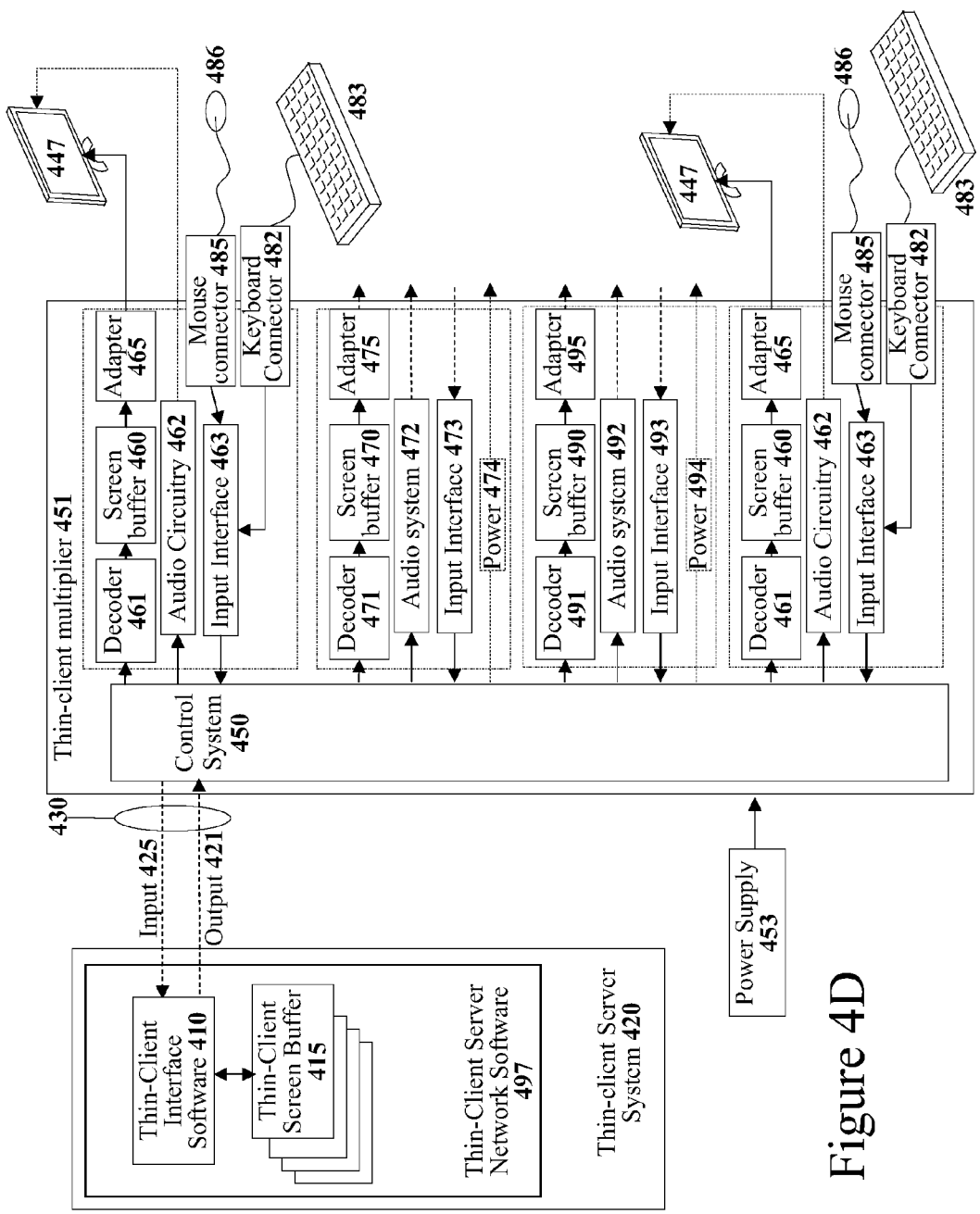
FIG. 4D illustrates a high-level block diagram of the example embodiment of the thin-client server computer system of FIG. 3A coupled via a universal serial bus connection to the example embodiment of the thin-client multiplier of FIG. 4A for supporting multiple individual thin-client terminal systems from the embodiment of FIG. 2A.

FIG. 4D illustrates an alternate embodiment of the thin-client multiplier 451 from FIG. 4A. In the embodiment of FIG. 4D, the functionality from the thin-client terminal system 440 has been integrated into the thin-client multiplier 451 for two of the terminal interface circuits. In this manner, keyboards 483, mice 486, and displays 447 (collectively, "input/output devices") may be coupled directly to the thin-client multiplier 451 to create terminal workstations without requiring additional thin-client terminal boxes 440. This further reduces the cost for implementing a thin-client terminal system. Note that the functionality from the thin-client terminal systems 440 may be integrated into the thin-client multiplier 451 for any number of terminal interface circuits.

The preceding technical disclosure is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. §1.72(b), which requires that it allow the reader to quickly ascertain the nature of the technical disclosure. The abstract is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

What is claimed is:

1. A terminal multiplier apparatus, said terminal multiplier apparatus comprising:
   an interface component configured to bi-directionally communicate data between a thin-client terminal and a thin-client server system;
   a control system connected to the interface component and configured to:
     receive output data that includes an address of a terminal interface circuit among a plurality of terminal interface circuits at the terminal multiplier apparatus from the thin-client server system, and
     distribute the output data from the thin-client server system to the thin-client terminal via the terminal interface circuit identified by the address included with the output data, the terminal interface circuit configured to process and distribute the output data to the corresponding thin-client terminal, the terminal interface circuit comprising:
       a screen buffer to store a digital representation of a video display of the thin-client terminal, and
       an input interface to receive input information from the thin-client terminal,
     at least one terminal interface circuit of the plurality of terminal interface circuits further comprising at least one input/output device port configured to directly connect with a user input/output device of a thin-client terminal corresponding to the at least one terminal interface circuit, the terminal interface circuit comprising a video adapter to read the screen buffer and generate an analog video signal for the corresponding terminal system,
   the control system being further configured to aggregate the input information received by the plurality of terminal interface circuits, and
   the interface component being further configured to receive the aggregated input information from the control system and transmit the aggregated input information to the server.

2. The terminal multiplier apparatus of claim 1, wherein said each terminal interface circuit further comprises:
   an audio system to generate an audio signal for the corresponding terminal system.

3. The terminal multiplier apparatus of claim 1, wherein the each terminal interface circuit further comprises:
   a power system to generate a power signal provided to the corresponding terminal system.

4. The terminal multiplier apparatus of claim 1, wherein the interface component obtains a unique network address for each terminal system supported by the terminal multiplier system.

5. The terminal multiplier apparatus of claim 1, wherein the control system receives video data from the server system and places the video data into an appropriate screen buffer associated with one of the corresponding terminal systems.

6. The terminal multiplier apparatus of claim 1, wherein the interface component is configured to bi-directionally communicate digital information with the server system via at least one of an Ethernet cable, a wireless connection, and a Universal Serial Bus (USB) cable.

7. The terminal multiplier apparatus of claim 1, wherein the each terminal interface circuit is further configured to support input/output devices directly coupled to the each terminal interface circuit.

8. A method of interacting with a server system, said method comprising:
   receiving output data that includes an address of a terminal interface circuit among a plurality of terminal interface circuits located at the terminal multiplier apparatus from the server system on a bi-directional digital interface, the output data associated with one of a plurality of thin-client terminals;
   processing the output data with a control system;
   passing the output data to the terminal interface circuit from among the plurality of terminal interface circuits housed in a graphics terminal multiplier device, based on the address, each terminal interface circuit for processing the output data and providing processed output data to a corresponding thin-client terminal of the plurality of thin-client terminal systems, the each terminal interface circuit of the graphics terminal multiplier device comprising a screen buffer for storing a digital representation of a video display for the corresponding thin-client terminal, at least one terminal interface circuit of the plurality of terminal interface circuits further comprising at least one input/output device port configured to directly connect with a user input/output device of a thin-client terminal corresponding to the at least one terminal interface circuit;
   reading the screen buffer; and
   generating an analog video signal for the corresponding thin-client terminal.

9. The method of claim 8, further comprising receiving, by an input interface of the each terminal interface circuit, input information from the corresponding thin-client terminal.

10. The method of interacting with a server system of claim 8, further comprising:

generating an audio signal for the corresponding thin-client terminal using an audio system circuit in said one of the plurality of terminal interface circuits.

11. The method of interacting with a server system of claim 8, further comprising:
   transmitting electrical power to the corresponding thin-client terminal.

12. The method of interacting with a server system of claim 8, further comprising:
   obtaining a unique network address for each thin-client terminal of the plurality of thin-client terminals.

13. The method of interacting with a server system of claim 8, wherein the passing the output data to the one of the plurality of terminal interface circuits comprises:
   decoding the video data; and
   placing the video data into the screen buffer associated with the corresponding thin-client terminal.

14. A terminal multiplier apparatus, comprising:
   a control system configured to receive output data for a plurality of thin-client terminals from a server system;
   a plurality of terminal interface circuits, each terminal interface circuit configured to:
      receive output data that includes an address of a terminal interface circuit among a plurality of terminal interface circuits at the terminal multiplier apparatus, from the control system; and
      provide processed output data to a thin-client terminal among the plurality of thin client terminals based on the address, each terminal interface circuit comprising an input interface to receive input information from the thin-client terminal, and
      at least one terminal interface circuit of the plurality of terminal interface circuits further comprising at least one input/output device port configured to directly connect with a user input/output device of a thin-client terminal corresponding to the at least one terminal interface circuit, the terminal interface circuit comprising a video adapter to read the screen buffer and generate an analog video signal for the corresponding terminal system.

15. The terminal multiplier apparatus of claim 14, wherein the each terminal interface circuit comprises:
   a screen buffer configured to store a digital representation of a video display for the corresponding thin-client terminal; and
   a power system to generate a power signal for the corresponding thin-client terminal.

16. The terminal multiplier apparatus of claim 14, further comprising a digital interface configured to bi-directionally communicate digital information with the server system via at least one of an Ethernet cable, a wireless connection, and a Universal Serial Bus (USB) cable.

17. The terminal multiplier apparatus of claim 16, wherein the digital interface obtains a unique network address for each corresponding thin-client terminal supported by the terminal multiplier system.

18. The terminal multiplier apparatus of claim 14, wherein each terminal interface circuit is further configured to provide the processed output data to input/output devices directly coupled to the each terminal interface circuit.

* * * * *